United States Patent [19]
Carr et al.

[11] 3,714,444
[45] Jan. 30, 1973

[54] SUSPENDED SOLIDS ANALYZER

[75] Inventors: Larry R. Carr, Vienna, Va.; George J. Topol, Reston, Va.

[73] Assignee: Keene Corporation, Aurora, Ill.

[22] Filed: July 16, 1970

[21] Appl. No.: 55,505

[52] U.S. Cl..............250/218, 250/222 PC, 356/208
[51] Int. Cl..............................................G01n 21/36
[58] Field of Search..250/222 PC, 218, 43.5, 43.5 D; 356/103, 104, 208, 209; 317/124, 130

[56] References Cited

UNITED STATES PATENTS

| | | | |
|---|---|---|---|
| 3,027,461 | 3/1962 | Kavanaugh | 356/104 |
| 3,510,666 | 5/1970 | Topol | 356/208 |
| 3,320,428 | 5/1967 | Wagstaffe | 250/218 |

FOREIGN PATENTS OR APPLICATIONS 1,498,611  5/1969  Germany..............................356/209

*Primary Examiner*—Archie R. Borchelt
*Assistant Examiner*—D. C. Nelms
*Attorney*—James R. Campbell

[57] ABSTRACT

A system including an improved sensing probe for detecting and measuring the concentrations of suspended solids in a liquid. The probe includes a light source for reflecting light off suspended particles in a liquid and photocells for receiving the reflected light and generating output signals. The output signals from both photocells are processed through a logarithmic ratio converter to provide a single output which accurately represents the concentration of suspended solids in the liquid.

5 Claims, 8 Drawing Figures

INVENTORS
GEORGE J. TOPOL
LARRY R. CARR
BY James R Campbell
ATTORNEY

INVENTORS
GEORGE J. TOPOL
LARRY R. CARR
BY
*James R. Campbell*
ATTORNEY

INVENTORS
GEORGE J. TOPOL
LARRY R. CARR
BY James R Campbell
ATTORNEY

SUSPENDED SOLIDS ANALYZER

BACKGROUND OF THE INVENTION

The invention described herein relates to detection and measurement systems and particularly to a probe and associated circuit components useful in detecting and measuring the concentration of suspended solids in waste waters and other liquids.

Prior efforts to detect and measure the concentration of suspended solids in liquids and particularly sewage effluent and mixed liquor at any particular point in a sewage system, has led to the design of a multiplicity of instruments of varying cost and complexity. These instruments range in design from those constructed to operate in the clean environments of laboratories to those adapted for submersion in a liquid containing the suspended particles to be measured. As a result, they operate on different principles and the instrument design is primarily dictated by the specific application or installation.

The electro-optical type of instrument constructed for submersion in a liquid apparently is preferred for use in waste water treatment systems. As is well known to engineers and others working in this field, the environment in which it is intended to function is so hostile that many of the problems associated with the generation of accurate data on sewage system operations have yet to be resolved. However, a major step taken in this direction resides in the development of a suspended solids analyzer probe which is disclosed and claimed in copending patent application, Ser. No. 857,921 filed Sept. 15, 1969 in the name of George J. Topol and assigned to the assignee of the present invention.

That patent application discusses the prior art problems of simultaneously and continuously detecting and measuring the concentration of suspended solids in liquids, particularly in sewage systems. As indicated in the application, past measurements have been made by passing light directly through liquid to a photocell, or by passing light into the liquid and measuring the amount of light scattered in the lateral direction by the solids in the liquid, or by directing light into the liquid and measuring the light reflected backwardly by the solids in the liquid.

In the latter two methods, as the concentration of suspended solids increases and with light directed into the liquid, the photocell response tends to become non-linear and the electrical signal from the photocell drops off and does not truly reflect the actual concentration of suspended solids. The photocell cannot discriminate between low ranges and high ranges of solids concentration in the liquid and the signal therefore cannot be relied upon for controlling system operations. Further the window through which light is directed into the liquid and reflected to the photocell permits reflection from the glass to provide a false input to the photocell. Moreover, light reflected from opposite side walls of the container, deterioration of the lamp bulb filaments and film on the windows likewise adversely affect the ability of the photocell to furnish signals accurately showing the concentration of suspended solids.

The suspended solids analyzer disclosed in the Topol application effectively resolves the above problems by utilizing a design of probe having a light source and two or three photocells along with compensating elements which accommodate changing conditions in the probe elements. However, extensive operating experience with the probe and associated circuitry shows that even though the compensating elements account for reduced light intensity received by the photocell as a result of the deposition of film on the protective windows, the film detracts from the operating efficiency. The device is susceptible to the formation of heavier deposits in the areas of one of the photocells such that the effect is one of diminution of light which otherwise should be delivered to the photocells. Because of this, under unusually severe conditions of operation, the photocells have difficulty in performing their compensation function and the readout from the device and compensating circuitry shows that a drift from actual conditions takes place.

It therefore is a primary object of our invention to eliminate or substantially minimize the aforementioned disadvantages in present designs.

Another object of our invention is to provide a new design of probe capable of retarding or preventing the establishment of film deposits on the probe surface.

Still another object of our invention is the provision of improved circuitry for eliminating drift and for providing a linear output which truly reflects solids concentration as changes take place in the component parts and in the degree of film formation.

Another object of our invention is the provision of a method for simultaneously and continuously detecting and measuring the concentration of suspended solids in waste water plants.

Briefly stated, in accordance with one aspect of our invention, we eliminate the disadvantages in most prior designs by detecting and measuring the solids concentration by electro-optical means and taking the ratio of electric signals representative of the solids to obtain a linear readout truly indicative of solids concentration. Improved design of optical surfaces helps assure the consistent delivery and return of light from the suspended solids by minimizing and equalizing the deposition of film on the optical surfaces. In practicing our invention in its broader aspects, it will occur to those skilled in the art that the electro-optical means and readout circuitry may take various forms and that the principles about to be disclosed are equally applicable to corresponding devices useful in performing the functions ascribed to this invention.

The subject matter which we regard as our invention is particularly pointed out and distinctly claimed in the concluding portion of this specification. Our invention, however, both as to organization and method of operation, together with further objects and advantages thereof, may best be understood by reference to the following description taken in connection with the accompanying drawing in which:

Figure 2:
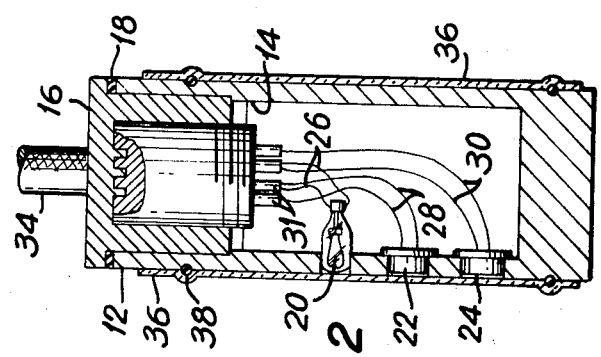
FIG. 2 is a cross-sectional view in elevation showing the disposition of elements comprising the probe.
Figure 1:
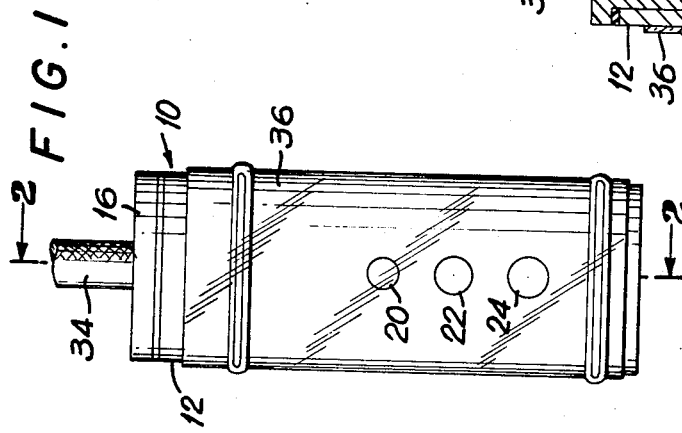
FIG. 1 illustrates the design and configuration of a suspended solids analyzer probe adapted for submersion in a liquid.

Referring now to the drawings wherein like reference characters designate like or corresponding parts throughout the several views, there is shown in FIGS. 1 and 2, a preferred design of suspended solids analyzer probe or sensing head adapted for submersion in a liquid. The other important part of the apparatus consists of electronic circuitry including a logarithmic ratio converter shown in FIG. 4, for obtaining a true indication of the concentration of suspended solids in the liquid.

Referring to FIGS. 1 and 2, the sensing head or probe 10 comprises a cylindrical housing 12 having an internal bore 14 permanently closed at one end and designed to be closed at its other end by a bayonet, screw type or other cap 16 and gasket 18 or other sealing means.

The housing is furnished with openings into which a lamp bulb 20 and photocells 22 and 24 are inserted and anchored in position in the housing sidewalls by conventional means, such as screw-threads. Conductor pairs 26, 28 and 30 are connected at one end to the lamp bulb and photocells and terminate at their other ends in connector pins 31 mounted in cap 16 closing the bore opening. Electrical power is supplied to the conductors from a power source 32, cable and female plug 34 and pins 31 secured in the cap.

To help assure watertight integrity of the sensing head or probe body, a polyethylene, TEFLON or other transparent sheath 36 is shrunk over to the cylindrical housing and over O-rings 38 fitted in grooves in the housing body. As indicated previously, when the probe is submerged in a liquid such as sewage, a translucent film slowly is deposited on object surfaces which tend to impede the transmission of light from the lamp 20 to the suspended solids in the liquid and from the suspended solids to the photocells. It has been found that the TEFLON sheath not only serves a sealing function but equally important, minimizes to a substantial degree, the deposition of a film on the low friction TEFLON surface. This action results, not only from the sheath material itself, but also from the continual flow of circulated sewage particles against the probe surfaces which tends to rub or wipe it clean. It will be obvious that other low friction products may be substituted for those disclosed herein for minimizing the formation of unwanted films on the transparent surfaces.

Figure 4:
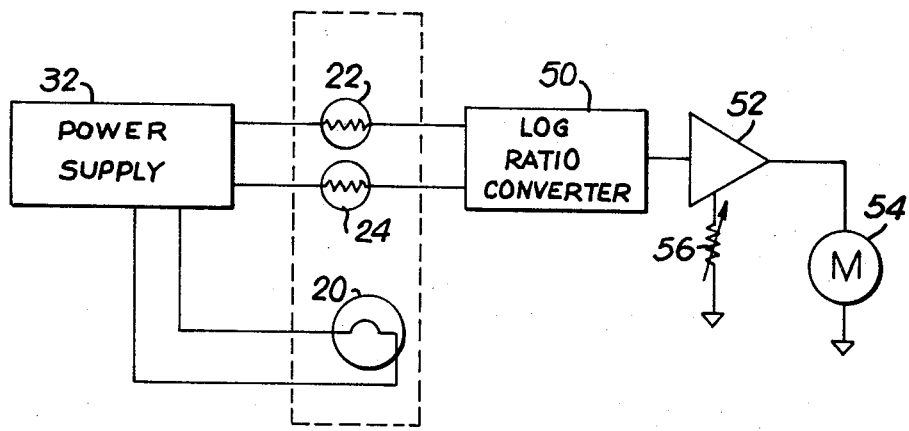
FIG. 4 shows the components of a remotely positioned electrical circuit capable of producing an electrical output representative of concentration of suspended solids in a tank.

The purpose of the circuitry shown in FIG. 4 is to provide an electric signal directly proportional to the concentration of suspended solids in the liquid and thereby permit the use of conventional control and recording equipment in controlling sewage plant operations. Such a system for controlling sewage system components is disclosed and claimed in the copending application of Thomas A. Rose, Ser. No. 5,765 filed Jan. 26, 1970, and assigned to the same assignee as the present invention.

As background, suspended particles or solids in a liquid directly affect the ability of light to pass through it and two effects simultaneously take place. First, the light is absorbed by suspended particles, which appears as a reduction of intensity of light beam passing through the liquid. Second, the light is scattered, or reflected by the particles, which appears as increased haziness of the liquid when observed at an angle from the incident light beam. Both effects are present at any given concentration and are mutually interrelated.

When attempt is made to measure suspended solids concentration by utilizing the light back-scattering effect, and a photocell is used to sense light scattered backwardly from the suspended solids, the photocell signal will increase uniformly up to a certain solids concentration. The signal then becomes nonlinear for higher suspended solids concentrations and eventually passes the curve peak and diminishes rapidly with increase in concentration. As the curve slopes downwardly, it is not possible for readout equipment to discriminate between low or high solids concentrations. MOreover, the photocell current is not only influenced by the suspended solids concentration but also by the brightness of the light source which decreases as the lamp filaments age or with reduction in voltage, and by the film which may have been formed on the optical viewing surfaces. In prior designs, any one or a combination of these variables caused false indications of the concentration of suspended solids in the liquid undergoing test.

The invention described herein overcomes these factors which are adverse to the measurement of suspended solids by utilizing two photocells situated at different distances from the light source as shown in FIGS. 1 and 2. While the response of each photocell is nonlinear in the manner described above, a logarithmic ratio of the two signals will produce an output signal which is directly proportional to the suspended solids concentration, thus permitting the acquisition of reliable suspended solids readings. An important advantage gained from this arrangement is that the logarithmic ratio is essentially unaffected by changes of light brightness caused by lamp bulb aging or reduction in supply voltage and by coating of optical surfaces by any adhering deposits.

In principle, the two photocells respond to the light absorption effect, thus following Beer's Law of Light Absorption which suggests that light is absorbed exponentially with distance and concentration. The light unabsorbed by the suspended solids reaches the photocells through reflection or back-scattering from the suspended particles. The utilization of logarithmic ratio circuitry eliminates the common mode interference of incident light intensity and at the same time converts the logarithmic law of absorption into a linear signal.

Figure 3:
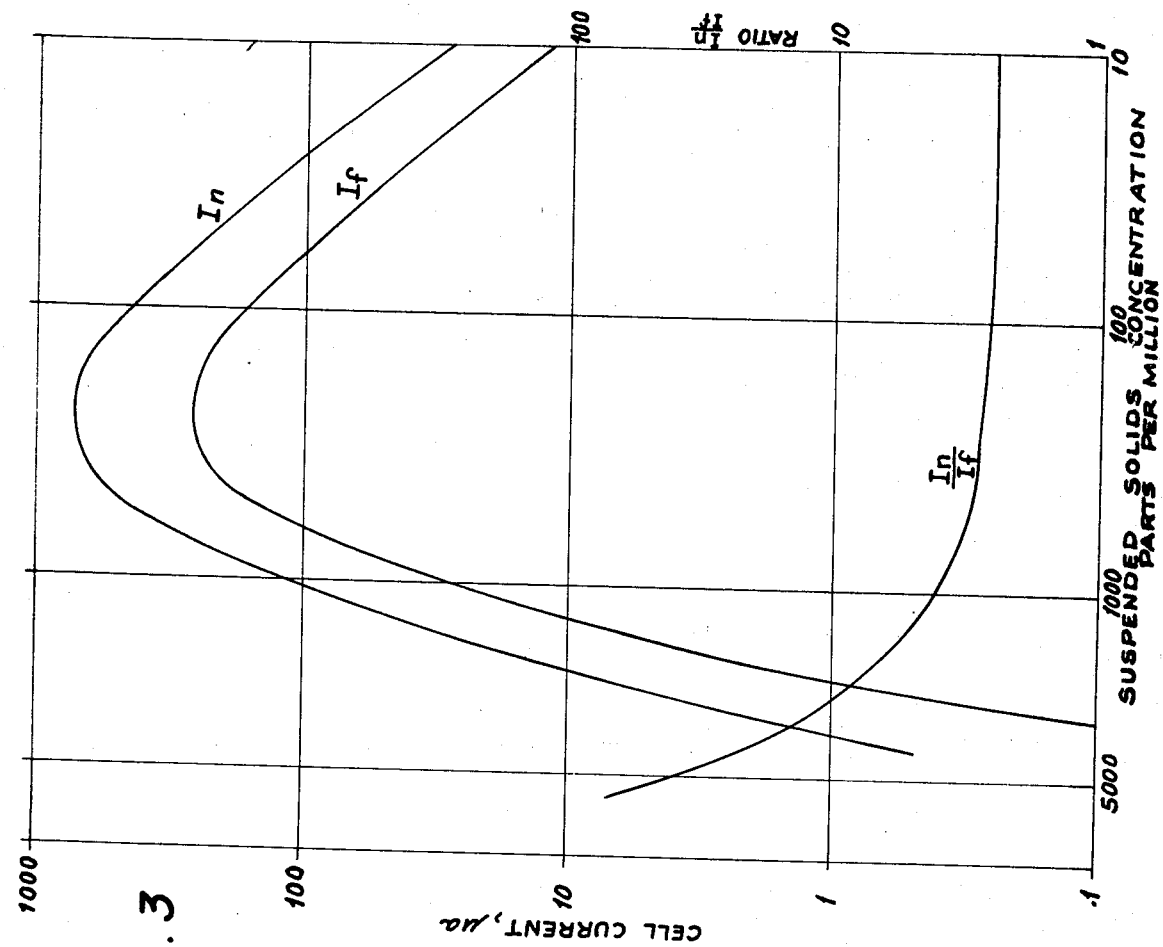
FIG. 3 illustrates curves showing near and far photocell response and an accurate indication of solids concentration before conversion by a logarithmic converter.

Referring now to FIG. 3, the curves shown are a plot of suspended solids concentration in parts per million on the horizontal axis with photocell current in microamperes and the logarithmic ratio of currents flowing from the near and far photocells respectively on the vertical axis. It will be observed that curves $I_N$ (near photocell) and $I_F$ (far photocell) rise nearly linearly from right to left and after reaching a peak drop off essentially uniformly as solids concentration increases. In the example chosen, as light is directed from lamp 20 into a liquid containing suspended solids, the photocell current output rises nearly linearly with increase in suspended solids. As the solids concentration reaches about 250 parts per million, both curves $I_N$ and $I_F$ peak out respectively at 750 and 275 microamperes. The difference in magnitude of current indicated by both curves results from the photocell nearest the light source being exposed to a greater amount of reflected light from the suspended particles than the far photocell.

As the solids concentration increases beyond 250 parts per million, the amount of reflected light capable of finding its way back to the photocells decreases.

Under these conditions, it is apparent that neither photocell alone can discriminate between for example, 200 and 1,000 parts per million of suspended solids.

This major disadvantage is overcome by this invention by utilizing the output of both photocells and the circuit arrangement shown in FIG. 4 which includes a logarithmic ratio converter capable of providing an output proportional to the concentration of suspended solids over a wide solids range.

The circuit of FIG. 4 includes a power supply 32 connected to the lamp 20 and photocells 22 and 24. As light is directed into the liquid, the photocells respond to the reflected light and respectively produce output currents $I_N$ and $I_F$ in accordance with the degree of solids concentration as described above. The currents $I_N$ and $I_F$ are supplied to logarithmic ratio converter 50 which produces an output voltage $e_0 = \log I_N/I_F$. This voltage $e_0$ is amplified by amplifier 52 by a factor $K$ to provide voltage $e_1$, so that $$e_1 = K \log \frac{I_N \text{ (light at near photocell)}}{I_F \text{ (light at far photocell)}}$$

The voltage $e_1$ is then supplied to a voltmeter 54 which is calibrated with a linear scale in parts per million of suspended solids. Variable resistor 56 controls the gain of amplifier 52 to cause variation in the amplification factor $K$ and produce a corresponding change in voltmeter 54.

It is desirable but not necessary that the voltage of power supply 32 be regulated and held constant but should a voltage change occur by a percentage P the amount of light reflected to photocells 22 and 24 would change in a corresponding amount. However, since the percentage change of voltage is the same, the amount of increase or decrease in light intensity resulting from such change will directly affect both photocells to the same degree and thus cancel each other out. The voltage $e_0$ will therefore remain unchanged with changes in power supply voltage.

Likewise, the same principle applies to changes in light source characteristics, such as aging of the lamp filaments, and to the light diminishing effects caused by the formation of a slime or a film coating sheath 36 covering the light source and photocells. Such changes in light transmitted or received will affect both photocells in the same proportion and a self-compensating effect takes place.

Figure 5:
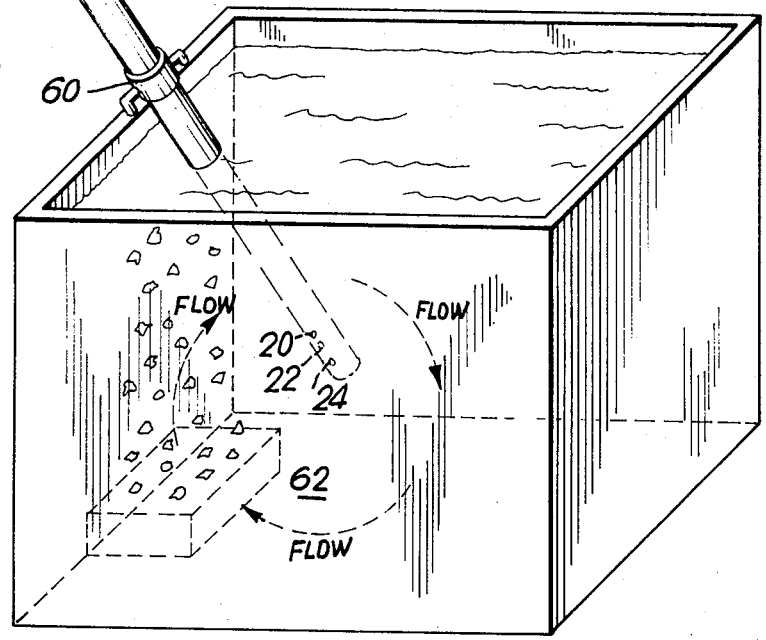
FIG. 5 illustrates the disposition of the probe when mounted in a tank containing suspended solids in a liquid.

FIG. 5 illustrates the disposition of the probe of FIGS. 1 and 2 in a tank or other liquid carrying container. Most of the electrical components of FIG. 4 are positioned at a point remote from where the probe is located. Since the probe 10 is designed for operation in the liquid, it is suspended from a bracket 60 mounted either on top of tank 62 or from a supporting structure associated therewith. By positioning the probe at an angle with the flow, stringy and rough materials circulated in the tank as shown, will pass in contact with the sheath 36 and will be wiped away minimizing the establishment of a film or coating on the sheath surface.

Although a tank is illustrated to show a mounting arrangement, it will be apparent to those skilled in the art that it can be mounted in a trough, pipe or other liquid carrying device carrying a liquid containing suspended solids to be measured.

Figure 6:
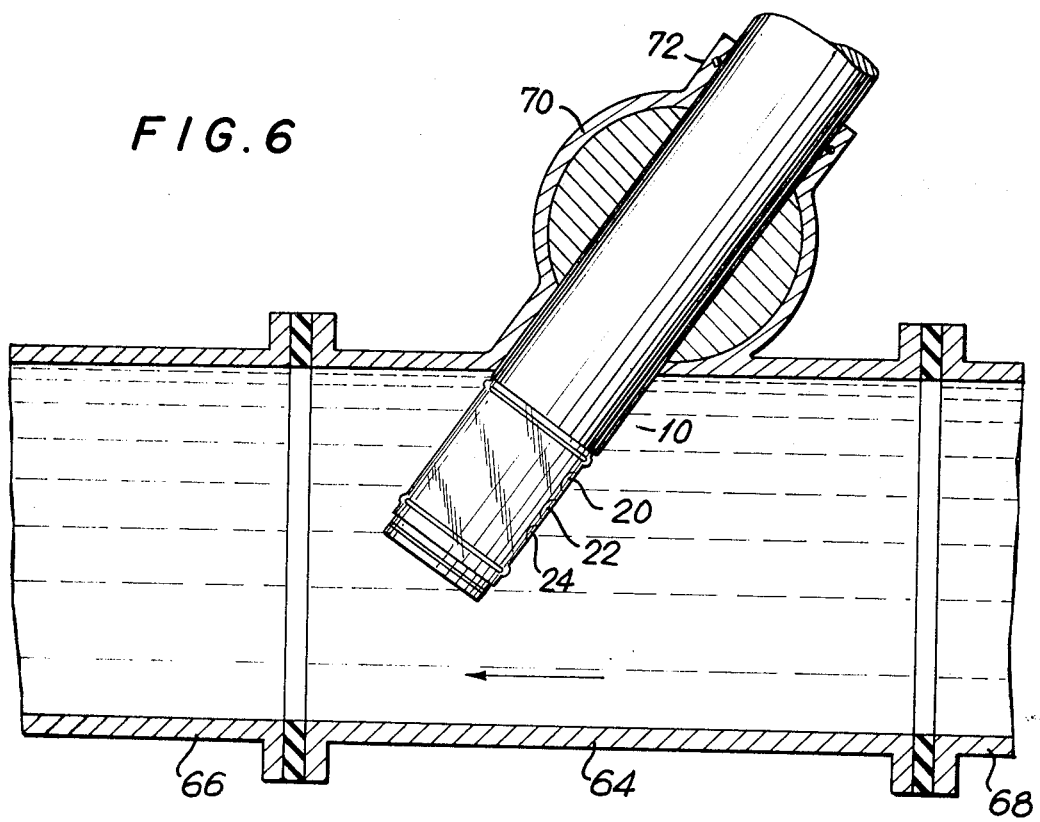
FIG. 6 shows a modification of the arrangement for mounting the probe in a pipe.

A more specific design is shown in FIG. 6. A section of pipe 64 is located between adjacent pipe sections 66 and 68 in the usual way. The intermediate section 64 is designed to include a corporate cock 70 having a central portion through which the probe is adapted for insertion. O-rings 72 prevent leakage from the pipe to the atmosphere.

As shown, the probe is mounted at about a 30° angle but it can vary depending on the particular installation. The lamp 20 and photocells 22 and 24 should face in the direction opposite to flow to permit the liquid to brush against the exposed surfaces and help keep it clean.

In those instances where the flow is apt to reverse itself, as from positive reversal of pump operation, the probe desirably should be supported in a vertical position rather than at an angle to the vertical as previously mentioned.

Figure 7:
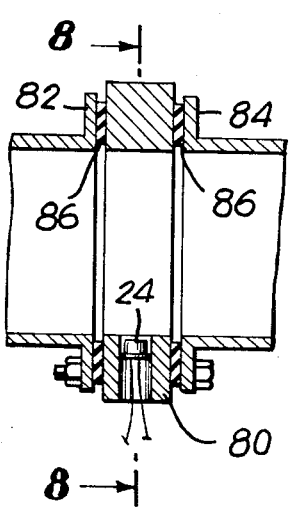
FIG. 7 illustrates an arrangement showing a modified probe designed for mounting in a pipe flange.
Figure 8:
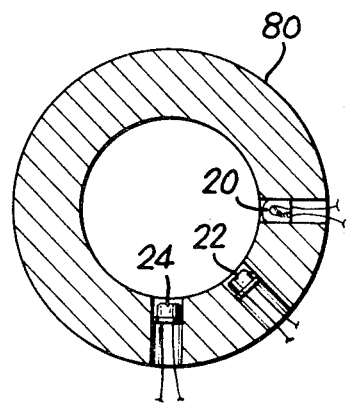
FIG. 8 is a view taken on lines 8—8 of FIG. 7.

The modification shown in FIGS. 7 and 8 illustrates locating the lamp 20 and photocells 22 and 24 in a cylindrical ring 80 designed for insertion between flanges 82 and 84 on adjacent pipe sections. Gaskets 86 provide a watertight joint when the flanges are bolted together. The light transmitting and receiving components are preferably positioned toward the bottom of the pipe to assure having them covered by the liquid carrying suspended particles. Since heavier particles will tend to flow near the bottom inside surface of the pipe, a greater opportunity is presented to wipe the surface clean as liquid flows through the pipe.

Although the foregoing disclosure has been directed toward the use of light falling in the incandescent range, light rays in the infra-red and other zones are intended to fall within the scope of the invention. When such different light sources are employed, it will be apparent to those skilled in the art that the parameters in the circuitry should be changed to accommodate the different magnitude of signals generated by the photocells. Further, photocells have been used throughout the description as representing the preferred embodiment but it will be understood that substitute light sensing devices may be used to secure compatibility between the system components.

In view of the above, it is obvious many modifications and variations are possible in light of the above teachings. It therefore is to be understood that within the scope of the appended claims, the invention may be practiced other than as specifically described.

What we claim as new and desire to secure by United States Letters Patent is:

1. A system for detecting and measuring the concentration of suspended solids in a liquid comprising:

a sensing device adapted for submersion in a liquid containing suspended solids, a power source connected with said device, said sensing device comprising a housing having a light source and a plurality of photocells, each of said photocells being located at different distances from said light source and positioned to sense only light scattered backwardly from the suspended solids, and conversion means connected with the output terminals of said photocells for taking the logarithmic ratio of the photocell output signals to provide a single output linearly representative of the solids concentration.

2. The combination of claim 1, wherein said light source and said plurality of photocells are disposed along a common straight plane.

3. The combination of claim 1, wherein said light source and said plurality of photocells are mounted in openings provided in the side walls of said housing and further comprising a transparent sheath having a continuous rounded surface mounted on said sidewalls in a water-tight relation to cover said openings.

4. A system for detecting and measuring the concentration of suspended solids in a liquid comprising:

a sensing device adapted for submersion in a liquid containing suspended solids, a power source connected with said device, said sensing device comprising an enclosed cylindrical housing having three openings in its side wall arranged in a straight line parallel to the axis of said cylindrical housing, a light source mounted in one of said openings, and a pair of photocells mounted in the remaining two opening, and conversion means connected with the output terminals of said photocells for taking the logarithmic ratio of the photocell output signals to provide a single output linearly representative of the solids concentration.

5. The combination of claim 4, further comprising a transparent cylindrical sheath mounted on the exterior side wall surface of said cylindrical housing in a water-tight relation therewith to cover said openings.

* * * * *